(12) United States Patent
Ferris

(10) Patent No.: US 7,675,812 B2
(45) Date of Patent: Mar. 9, 2010

(54) METHOD FOR ATTENUATION OF MULTIPLE REFLECTIONS IN SEISMIC DATA

(75) Inventor: Edward James Ferris, Jakarta (ID)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 12/215,862

(22) Filed: Jun. 30, 2008

(65) Prior Publication Data

US 2009/0323470 A1    Dec. 31, 2009

(51) Int. Cl.
*G01V 1/38*    (2006.01)
(52) U.S. Cl. ........................................................ 367/24
(58) Field of Classification Search ............. 367/21–24, 367/38, 49
See application file for complete search history.

(56) References Cited

U.S. PATENT DOCUMENTS

| | | | |
|---|---|---|---|
| 4,486,865 A | 12/1984 | Ruehle | |
| 4,935,903 A | 6/1990 | Sanders et al. | |
| 4,979,150 A | 12/1990 | Barr | |
| 5,572,483 A * | 11/1996 | Chambers et al. | ............. 367/45 |
| 5,621,700 A | 4/1997 | Moldoveanu | |
| 7,415,401 B2 * | 8/2008 | Calvert et al. | ................. 703/10 |
| 2009/0103395 A1 * | 4/2009 | Willen | ......................... 367/22 |

* cited by examiner

*Primary Examiner*—Jack W. Keith
*Assistant Examiner*—Krystine Saito
(74) *Attorney, Agent, or Firm*—E. Eugene Thigpen; Richard A. Fagin

(57) ABSTRACT

A method for attenuating multiple reflections in seismic signals includes coherency filtering the seismic signals. The seismic signals are low pass filtered and high pass filtered seismic signals at a frequency selected such that substantially only multiple reflections exist in the seismic signals above the frequency. A mask is generated having unity value where the high pass filtered signal amplitude exceeds a selected threshold. The mask has unity zero value for all other filtered signals. The mask value is multiplied by the low pass filtered signals. The multiplied signals are added to the high pass filtered signals and a coherency filter is applied to remove remaining primary energy to generate a model of the multiple reflections. The multiple reflection model is subtracted from the coherency filtered seismic signals.

27 Claims, 3 Drawing Sheets

METHOD FOR ATTENUATION OF MULTIPLE REFLECTIONS IN SEISMIC DATA

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic exploration. More specifically, the invention relates to methods for processing seismic data to attenuate the effects of multiple reflections.

2. Background Art

In seismic exploration, seismic data are acquired by imparting acoustic energy into the earth near its surface, and detecting acoustic energy that is reflected from boundaries between different layers of subsurface earth formations. Acoustic energy is reflected when there is a difference in acoustic impedance between adjacent layers to a boundary. Signals representing the detected acoustic energy are interpreted to infer structures and composition of the subsurface earth structures.

In marine seismic exploration, a seismic energy source, such as an air gun, or air gun array, is typically used to impart the acoustic energy into the earth. The air gun or array is actuated at a selected depth in the water typically while the air gun or array is towed by a vessel. The same or a different vessel tows one or more seismic sensor cables, called "streamers", in the water. Generally the streamer extends behind the vessel along the direction in which the streamer is towed. Typically, a streamer includes a plurality of hydrophones disposed on the cable at spaced apart, known positions along the cable. Hydrophones, as is known in the art, are sensors that generate an optical or electrical signal corresponding to the pressure of the water or the time gradient of the pressure in the water. The vessel that tows the one or more streamers typically includes recording equipment to make a record, indexed with respect to time, of the signals generated by the hydrophones in response to the detected acoustic energy. The record of signals is processed, as previously explained, to infer structures of and compositions of the earth formations below the locations at which the seismic survey is performed.

Marine seismic data often include two particular artifacts that require techniques to account for in order to more accurately infer the structure and composition of the subsurface earth formations. These two artifacts, known as ghosting and water layer multiple reflections, arise because water has a substantially different acoustic impedance than the air above the water surface, and because water typically has a substantially different acoustic impedance than the earth formations at the bottom of the water (or sea floor).

Ghosting and water layer multiples can be understood as follows. When the air gun or air gun array is actuated, acoustic energy radiates generally downwardly where it passes through the sea floor and into the subsurface earth formations. Some of the acoustic energy is reflected at subsurface acoustic impedance boundaries between layers of the earth formations, as previously explained. Reflected acoustic energy travels generally upwardly, and is ultimately detected by the seismic sensors (hydrophones) on the one or more streamers. After the reflected energy reaches the streamers, however, it continues to travel upwardly until it reaches the water surface. The water surface has nearly complete reflectivity (reflection coefficient equal to unity) with respect to the upwardly traveling acoustic energy. Therefore, nearly all the upwardly traveling acoustic energy will reflect from the water surface, and travel downwardly once again. The acoustic energy reflected from the water surface will also be shifted in phase by about 180 degrees from the upwardly traveling incident acoustic energy. The surface-reflected, downwardly traveling acoustic energy is commonly known as a "ghost" signal. The ghost signal causes a distinct "notch", or attenuation of the energy within a limited frequency, in the acoustic energy detected by the hydrophones. The frequency of the notch in the detected acoustic signal is related to the selected depth at which the streamer is disposed, as is well known in the art.

The downwardly traveling acoustic energy reflected from the water surface, as well as acoustic energy emanating directly from the seismic energy source may reflect from the water bottom and travel upwardly, where it is detected by the hydrophones. This same upwardly traveling acoustic energy will also reflect from the water surface, once again traveling downwardly. Acoustic energy may thus reflect from both the water surface and water bottom a number of time before it is attenuated, resulting in so-called water layer reverberations. Such reverberations can have substantial amplitude within the total detected acoustic energy, masking the acoustic energy that is reflected form subsurface layer boundaries, and thus making it more difficult to infer subsurface structures and compositions from seismic data.

There are a number of "deghosting" and water layer effect attenuation techniques. One such technique is described in U.S. Pat. No. 4,486,865 issued to Ruehle. Pairs of detectors each comprise a geophone and a hydrophone. A filter is applied to the output of at least one of the geophone or hydrophone in each pair so that the frequency content of the filtered signal is adjusted. The adjustment to the frequency content is such that when the filtered signal is combined with the signal from the other sensor, the ghost reflections cancel.

U.S. Pat. No. 5,621,700 issued to Moldovenu also discloses using at least one pair of sensors in a method for attenuating ghosts and water layer reverberations.

U.S. Pat. No. 4,935,903 issued to Sanders et al. discloses a method for reducing the effects of water later reverberations which includes measuring pressure at vertically spaced apart depths, or by measuring pressure and particle motion using sensor pairs. The method includes enhancing primary reflection data for use in pre-stack processing by adding ghost data.

U.S. Pat. No. 4,979,150 discloses a method for marine seismic exploration in which output of substantially collocated hydrophones and geophones are subjected to a scale factor. The collocated hydrophones and geophones can be positioned at the sea floor or above the sea floor.

Much of the subsurface below bodies of water is impractical to survey using water bottom cables, further, practical marine seismic acquisition techniques to date make use of hydrophone sensors. Still further, there are large volumes of such hydrophone marine seismic data that could benefit from improved techniques for separating multiple reflections.

Accordingly, there continues to be a need for techniques for attenuating the effects of water layer multiple reflections on seismic data.

SUMMARY OF THE INVENTION

A method for attenuating multiple reflections in seismic signals according to one aspect of the invention includes coherency filtering the seismic signals. The seismic signals are low pass filtered and high pass filtered seismic signals at a frequency selected such that substantially only multiple reflections exist in the seismic signals above the frequency. A mask is generated having unity value where the high pass filtered signal amplitude exceeds a selected threshold. The mask has unity value for all other filtered signals. The mask value is multiplied by the low pass filtered signals. The multiplied signals are added to the high pass filtered signals to generate a model of the multiple reflections. The multiple reflection model is subtracted from the coherency filtered seismic signals.

Another aspect of the invention is a computer program stored in a computer readable medium. The program includes logic operable to cause a programmable computer to perform certain acts including low pass filtering and high pass filtering seismic signals at a selected frequency. The frequency is selected such that substantially only multiple reflections exist in the seismic signals above the frequency. A mask is generated having unity value where the high pass filtered signal amplitude exceeds a selected threshold. The mask has unity value for all other filtered signals. The mask value is multiplied by the low pass filtered signals. The multiplied signals are added to the high pass filtered signals to generate a model of the multiple reflections. The multiple reflection model is subtracted from the coherency filtered seismic signals.

Other aspects and advantages of the invention will be apparent from the following description and the appended claims.

DETAILED DESCRIPTION

Figure 1:
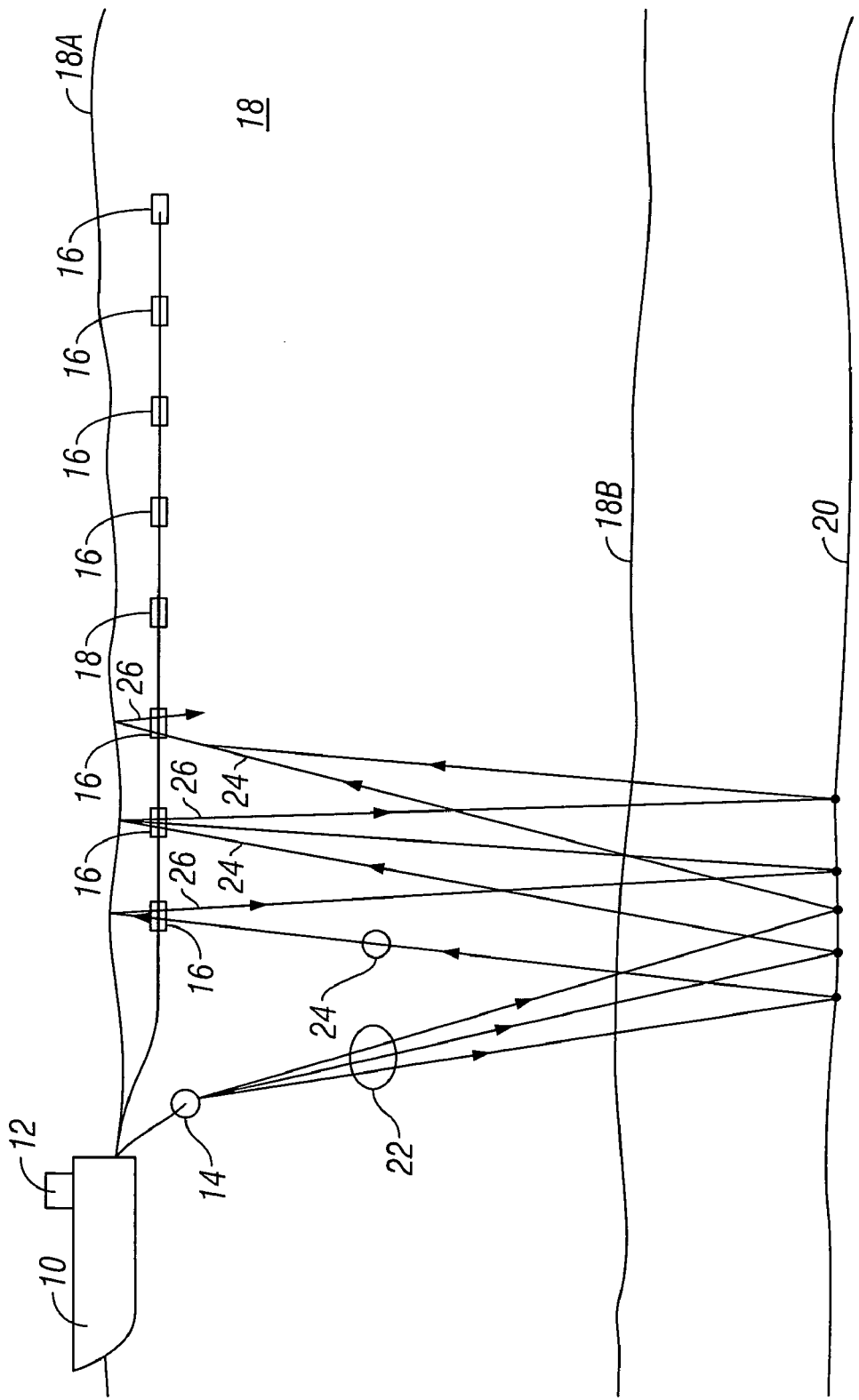
FIG. 1 shows an example of marine seismic data acquisition including water layer reverberations.

An example of marine seismic data acquisition that may be used with the invention is shown schematically in FIG. 1. A seismic survey vessel 10 moves along the surface 18A of a body of water 18 such as a lake or the ocean. The survey vessel 10 includes equipment shown at 12 and collectively referred to as a "recording system" that includes devices (not shown separately) for actuating a seismic energy source 14 at selected times, for determining geodetic position of the vessel 10, the source 14 and each of a plurality of seismic sensors 16 at any time, and for recording signals generated by the seismic sensors 16. The various devices that may be included in the recording system 12 are well known in the art and do not need to be described in any detail.

The seismic sensors 16 are typically hydrophones or other pressure or pressure gradient responsive sensor. Other types of seismic sensors may be used in other examples, such as particle motion responsive sensors. The seismic sensors 16 are disposed at spaced apart locations along cables referred to as streamers. The example in FIG. 1 shows only 1 streamer for clarity of the illustration, but the number of streamers, the number of sensors on the streamers and whether one or more streamers is towed by the survey vessel 10 or a different vessel are not limits on the scope of the present invention.

The seismic energy source 14 and the seismic sensors 16 are towed at a selected depth below the surface 18A of the water 18. During seismic data acquisition, the source 14, which may be an air gun or array of such guns, for example, is actuated at selected times and the signals produced by the seismic sensors 16 in response to seismic energy emitted by the source 14 are recorded by suitable devices in the recording system 12. The signal recordings are typically indexed with respect to the actuation time(s) of the seismic energy source 14. A separate signal recording may be made for each seismic sensor 16, or selected groups of the seismic sensors 16 may be in signal communication so that a corresponding recording is made of the signal generated by all the sensors in such a group. Typically there will be several thousand individual signal recordings, referred to as "channels" corresponding to the signals detected at each of a plurality of spaced apart groups of seismic sensors.

In general, seismic energy travels outwardly from the source 14 upon actuation thereof, and moves downwardly, shown at 22, through the water 18 until it reaches the water bottom 18B. The seismic energy continues downwardly through the subsurface until it reaches one or more subsurface acoustic impedance boundaries 20. The energy may be reflected at such boundaries and travel upwardly, shown at 24, where it reaches the seismic sensors 16 and is detected. The seismic energy continues to travel upwardly until it reaches the water surface 18A. The seismic energy is then reflected from the water surface 18A and travels downwardly again, at 26, where it may be detected by the seismic sensors 16 and continue to travel downwardly. The downwardly traveling seismic energy, whether reflected from the water surface 18A or whether traveling directly from the source 14, may also be reflected from the water bottom 18B. Reflection between the water surface 18A and water bottom 18B may continue for a number of cycles, creating artifacts in the seismic signals detected by the sensors 16 called "water layer reverberations" or "water layer multiples." The method of the invention is intended to reduce the effects of such "water layer multiples" in the seismic signals.

The method of this invention relies upon the bandwidth of "primary reflections", that is, seismic energy reflected once at boundaries in the subsurface, e.g., such as shown at 24 in FIG. 1, being limited to lower frequencies (for example, less than about 40 Hz), while the bandwidth of multiple reflections is broader.

Figure 2:
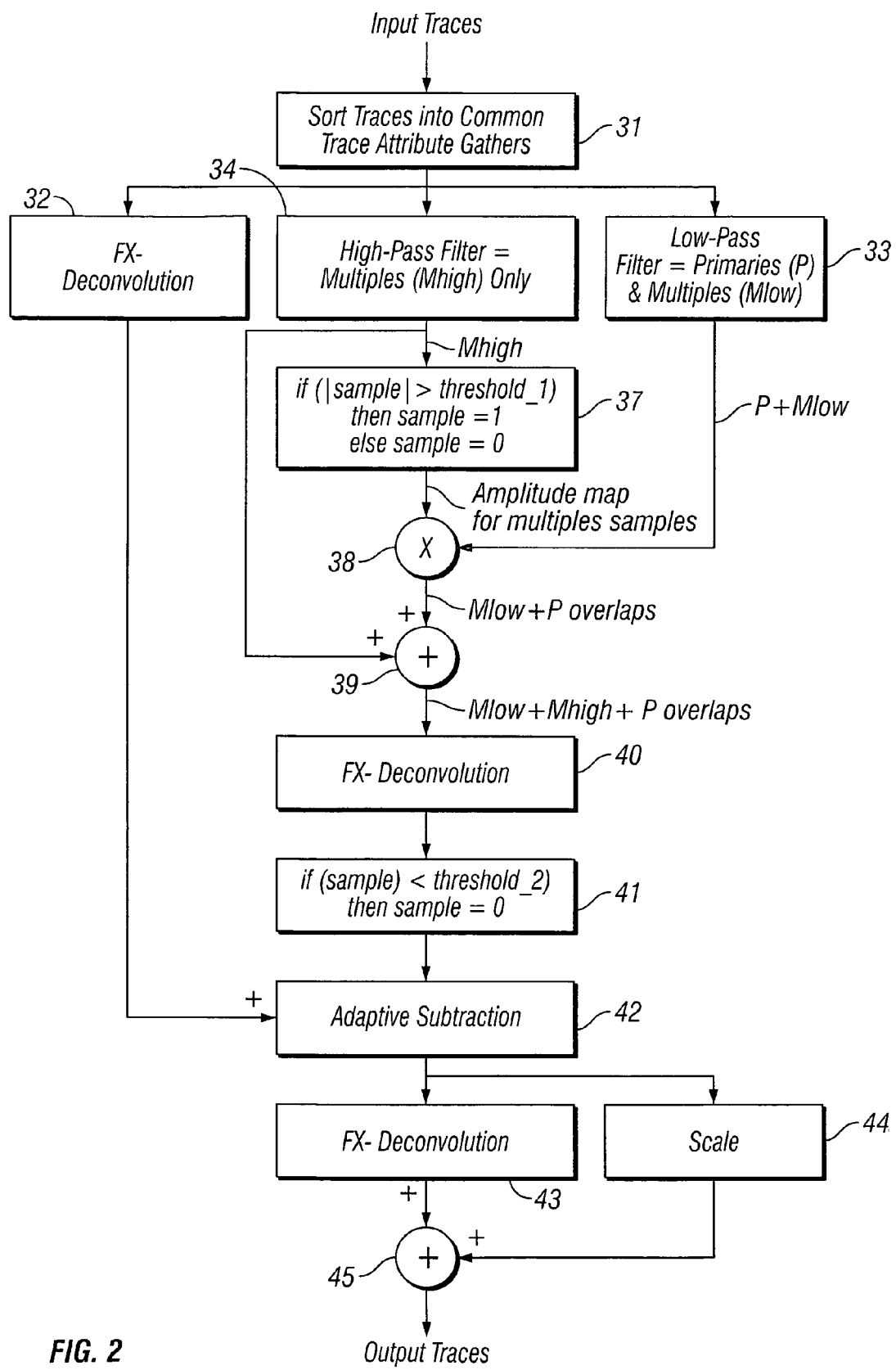
FIG. 2 is a flow chart of an example implementation of a method according to the invention.

Referring to FIG. 2, at 31, a first process element in a method according to the invention is to sort the seismic signals as originally recorded into common trace attribute gathers. A "trace" as used in connection with seismic signal processing means a record, typically with respect to recording time of amplitude of a seismic signal detected by a particular seismic receiver (or set of such receivers) in an array of such receivers. The attribute should be selected such that coherency filtering can be applied to the gathered traces to enhance seismic signals of interest and reduce the effect of random noise. One example of a common attribute gather is common source-to-receiver offset gathers. Other examples include common mid point gathers and common shot point gathers.

As explained above, the signal recordings typically include one signal recording for each a plurality of individual seismic sensors or groups of such sensors made at the time the source is actuated. Such common offset gathers are collections of the seismic signal recordings wherein at the time of recording of the seismic signals, each selected individual signal recording represents a same distance along the water surface (18A in FIG. 1) between the source position and the seismic sensor position. Primary reflections and multiple reflections will appear as coherent events in such common offset gathers, that is, high amplitude events evident in the signals will display some sort of a relationship between time of the high amplitude events and the acquisition geometry (offset).

At 32 a process called coherency filtering, which one example can be FX-deconvolution is performed on the common offset gathers to attenuate random noise, that is, to attenuate events in the signals that do not appear to have any relationship to acquisition geometry. In FX-deconvolution, spatial (e.g. 10 individual sensor signals or "traces") windows and time (e.g. 20 milliseconds) windows of input signals are Fourier transformed to the frequency-position (F-X) domain. Deconvolution operators are designed in the position (X) dimension to predict coherent parts of the signal. Subtracting the coherent parts will leave incoherent parts (random noise) which can then be inverse transformed and subtracted from the original signal. Succeeding windows are then similarly processed. Preferably there is some time and/or space overlap between windows. The result of the coherency filtering will be used later in the process as explained below.

At 33, a low-pass filter is applied to the seismic signal recordings. The cut-off frequency of the low-pass filter equal is selected to be the highest frequency expected to be contained in the primary reflections. The signals output from the low-pass filter contain the primary reflections (e.g., 24 in FIG. 1) essentially in their entirety and the low-frequency portion of the multiple reflections (e.g., 26 in FIG. 1). The low pass filtered signals may be designated $M_{low}$. The low-pass filter may be defined as having a pass band from 0-30 Hz, roll off beginning at 30 Hz and frequencies of 40 Hz and above are strongly attenuated. Similar filter characteristic may be selected for other cutoff frequencies for the low pass filter, depending on the frequency content of the specific seismic data.

At 34, a high-pass filter is applied to the signal recordings (at 32). The output of the high pass filtering of the signal recordings contains substantially no primary reflections, but will contain the high-frequency portion of the multiple reflections. The high pass filtered recordings may be designated $M_{high}$. The high-pass filter may be defined as strongly attenuating frequencies between 0 and 30 Hz, roll off beginning at 40 Hz, and freely passing frequencies of 40 Hz and higher. The transition zones (roll off) of the low pass filter and the high pass filter, used at 33 and 34, respectively, should be selected such that when their amplitude spectra are summed, the resulting amplitude spectrum is equal to unity for all frequencies. The two filters should also be zero-phase filters so as not to change the phase of the their respective input signals.

At 37, the magnitudes (absolute values) of trace samples after the foregoing high pass filtering are compared to a threshold value designated as threshold 1. If the magnitude of a trace sample is greater than threshold 1, a corresponding trace output sample is set equal to unity. If the trace magnitude is less than or equal to threshold 1, the corresponding trace output sample is set equal to zero. The foregoing procedure generates a map (or "mask") whose sample values are either unity, indicating a sample of a multiple wavelet, or zero, indicating a sample of a primary reflection wavelet or a sample indicating the absence of a multiple reflection wavelet. Because the sample values contained in the traces of a common-trace-attribute gather can be very different from one seismic survey to another, the numerical value of threshold 1 may be calculated, for example, as an average absolute value of all the trace samples in each trace gather. In practical examples the value of threshold 1 can be selected by an interpretive process. For example, the average amplitudes [average absolute values] of the data values in a time window containing reflections just prior to when any multiple reflections could arrive, i.e. just before two times the ocean bottom reflection time, as the initial value, and the results of the foregoing process can be examined on a single common-offset gather. The foregoing can be repeated using incrementally lower and higher values for threshold 1. Visual examination may result in selection of a value of threshold 1 that appears optimal for processing the entire set of data. If threshold 1 is too high, the amplitude map consists of nothing but zeros, and all of the low frequency data are eliminated from the model. If threshold 1 is set too low, the amplitude map consists of all ones, and all the low frequency data are contained in the model data that is adaptively subtracted (explained below) from the original data, thus attenuating or eliminating the primary reflections from the process output.

At 38, the map is multiplied, sample by sample, by the output of the low pass filtered signals, from 33. The result should essentially eliminate samples representing primary reflection wavelets, and leaving only the low-frequency portion of multiple reflections, $M_{low}$. Note that if a multiple reflection is coincident with a primary reflection, the resulting seismic wavelet will be equal to the sum of those two wavelets. So the output of 38 may be designated as $M_{low}+P_{overlaps}$.

At 39, the output of the multiplication from 38 is summed with the output) of the high pass filtering, from 32, resulting in full-bandwidth multiple reflections, $M_{low}+M_{high}$ (plus any $P_{overlap}$). The amplitudes of the $P_{overlaps}$ wavelets can be substantially reduced, as shown at 40, by coherency filtering. One example of coherency filtering that may be used is FX-deconvolution. Assuming the $P_{overlaps}$ amplitudes are fragmented by the previously applied mask, then the $P_{overlaps}$ amplitudes should appear to be random with respect to the coherency filter (e.g., FX-deconvolution) within the frequency range that the primary reflection amplitudes exist. Any primary reflection energy will therefore be attenuated, thus preserving it in the adaptive subtraction process described below.

At 41, the process includes applying an amplitude ramp to each trace so that there will be no adaptive subtraction (explained below) performed at times where there can be no multiple reflections (that is, at time values less than two-times the water-bottom reflection time). The value of that ramp can be zero from time equal to zero (source actuation time) to t=twice the water bottom reflection time less a preselected lag time. The ramp value can increase linearly to a value of 1.0 at a time of twice the water bottom reflection time. The ramp value can remain equal to 1.0 to the end of each trace. The ramp is multiplied, sample by sample, by the input trace amplitude value. The output of the ramping performed at 41 is a trace gather representing a model of the multiple reflection wavelets contained in the original trace gather.

At 42, the foregoing model of the multiple reflections from 41 is adaptively subtracted from the output of the FX-deconvolution (coherency filtering) performed at 32. The output of the adaptive subtraction can be processed by a coherency filter, at 43, for example, FX-deconvolution. The output of such filtering is added, at 45 to a selected fraction (scaling) of the input to the coherency filtering at 43. The "scale" is used only to limit where the FX-deconvolution is applied, because in some cases it might not be desirable to apply FX-deconvolution to short time (shallow) data. The output of the process, at 45 is traces that have multiple reflections substantially attenuated.

Figure 3:
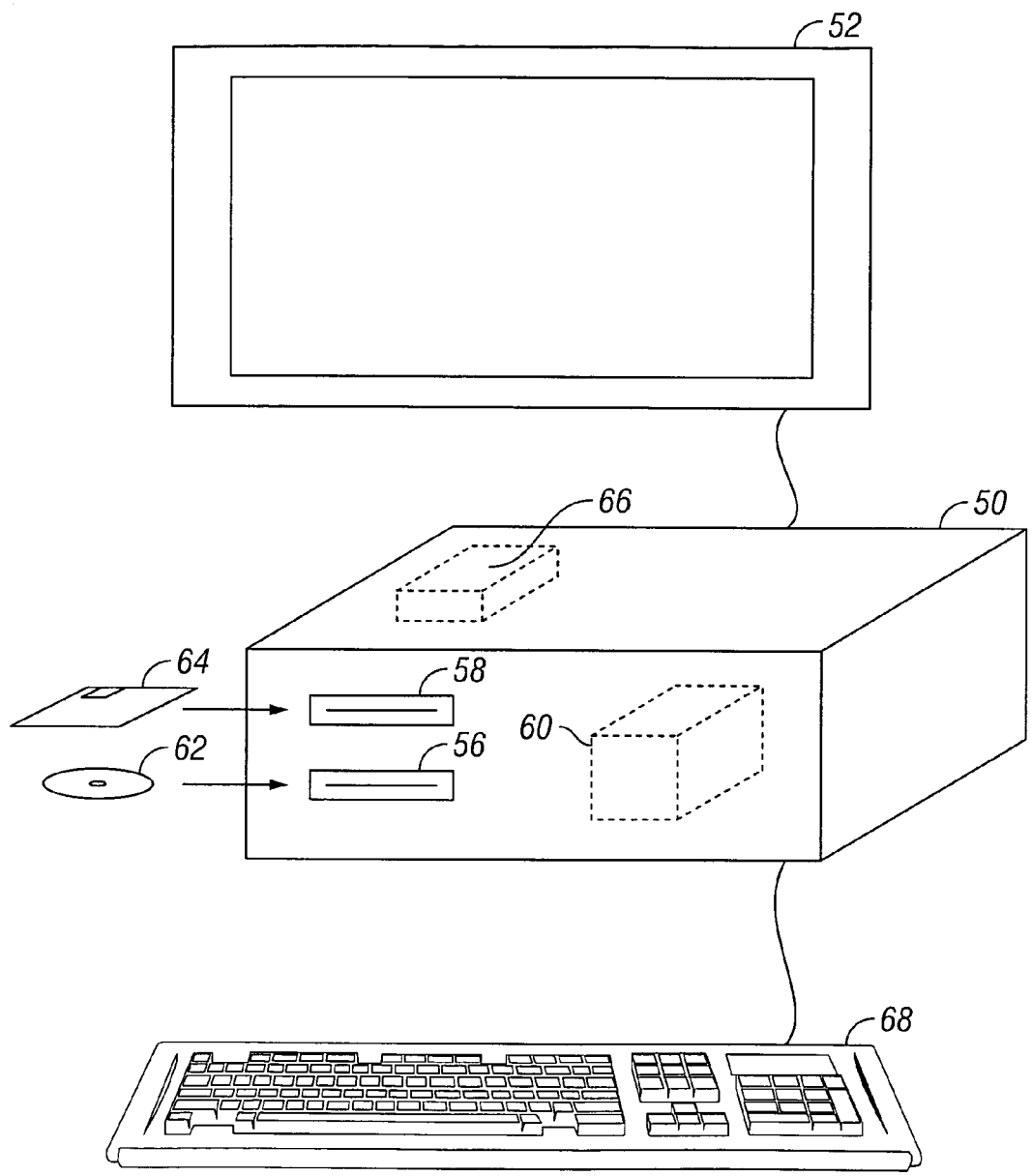
FIG. 3 shows a general purpose programmable computer with readable storage media.

In another aspect, the invention relates to computer programs stored in a computer readable medium. Referring to FIG. 3, the foregoing process as explained with respect to FIG. 2 can be embodied in computer-readable code stored on a computer readable medium, such as floppy disk 64, CD-ROM 60 or magnetic hard drive 66 forming part of a general purpose programmable computer 50. The computer 50, as known in the art, can include a central processing unit 60, a user input device such as a keyboard 68 and a user display 52 such as a flat panel LCD display or cathode ray tube display. The computer may include suitable devices for interrogating the floppy disk and CD-ROM, as shown respectively at 58 and 56. According to this aspect of the invention, the computer readable medium includes logic operable to cause the computer 50 to execute acts as set forth above and explained with respect to FIG. 2.

The invention may provide improved capability to separate multiple reflections from primary reflections in marine seismic data.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for separating multiple reflections from marine seismic signals, comprising on a computer:
    coherency filtering the seismic signals, the seismic signals acquired from a plurality of seismic sensors deployed in a body of water in response to actuation of a seismic energy source in the water;
    low pass filtering the seismic signals at a selected frequency;
    high pass filtering the seismic signals at the selected frequency, the frequency selected such that substantially only multiple reflections exist in the seismic signals above the frequency
    generating a mask having unity value where the high pass filtered signal amplitude exceeds a selected threshold, the mask having zero value for all other high pass filtered signals;
    multiplying the mask value by the low pass filtered signals;
    adding the multiplied signals to the high pass filtered signals to generate a model of the multiple reflections;
    subtracting the multiple reflection model from the coherency filtered seismic signals; and
    at least one of storing and displaying a result of the subtracting.

2. The method of claim 1 further comprising sorting the seismic signals into common trace attribute gathers prior to the coherency filtering, low pass filtering and high pass filtering.

3. The method of claim 1 wherein the coherency filtering comprises F-X deconvolution.

4. The method of claim 1 further comprising coherency filtering a result of the subtracting.

5. The method of claim 4 wherein the coherency filtering the subtraction result comprises F-X deconvolution.

6. The method of claim 1 wherein the subtracting comprises adaptive subtracting.

7. The method of claim 1 wherein the frequency is about 40 Hz.

8. The method of claim 1 wherein a combined amplitude spectrum of a roll off portion of the low pass filtering and a roll off portion the high pass filter is substantially unity.

9. The method of claim 1 wherein the low pass filtering and the high pass filtering are substantially zero phase.

10. A computer readable medium comprising a computer program, the program having logic operable to cause a programmable computer to perform acts, comprising:
    coherency filtering the seismic signals;
    low pass filtering the seismic signals at a selected frequency;
    high pass filtering the seismic signals at the selected frequency, the frequency selected such that substantially only multiple reflections exist in the seismic signals above the frequency
    generating a mask having unity value where the high pass filtered signal amplitude exceeds a selected threshold, the mask having zero value for all other high pass filtered signals;
    multiplying the mask value by the low pass filtered signals;
    adding the multiplied signals to the high pass filtered signals to generate a model of the multiple reflections;
    subtracting the multiple reflection model from the coherency filtered seismic signals; and
    at least one of storing and displaying a result of the subtracting to generate multiple reflection attenuated seismic data.

11. The computer readable medium of claim 10 further comprising sorting the seismic signals into common trace attribute gathers prior to the coherency filtering, low pass filtering and high pass filtering.

12. The computer readable medium of claim 10 wherein the coherency filtering comprises F-X deconvolution.

13. The computer readable medium of claim 10 further comprising coherency filtering a result of the subtracting.

14. The computer readable medium of claim 10 wherein the coherency filtering the subtraction result comprises F-X deconvolution.

15. The computer readable medium of claim 10 wherein the subtracting comprises adaptive subtracting.

16. The computer readable medium of claim 10 wherein the frequency is about 40 Hz.

17. The computer readable medium of claim 10 wherein a combined amplitude spectrum of a roll off portion of the low pass filtering and a roll off portion the high pass filter is substantially unity.

18. The computer readable medium of claim 10 wherein the low pass filtering and the high pass filtering are substantially zero phase.

19. A method for seismic surveying, comprising:
    deploying a plurality of seismic sensors at spaced apart locations in a body of water;
    at selected times, actuating a seismic energy source in the water;
    recording seismic signals detected by the seismic sensors;
    coherency filtering the seismic signals;
    low pass filtering the seismic signals at a selected frequency;
    high pass filtering the seismic signals at the selected frequency, the frequency selected such that substantially only multiple reflections exist in the seismic signals above the frequency
    generating a mask having unity value where the high pass filtered signal amplitude exceeds a selected threshold, the mask having zero value for all other high pass filtered signals;
    multiplying the mask value by the low pass filtered signals;

adding the multiplied signals to the high pass filtered signals to generate a model of the multiple reflections;

subtracting the multiple reflection model from the coherency filtered seismic signals; and at least one of storing and displaying a result of the subtracting.

20. The method of claim 19 further comprising sorting the seismic signals into common trace attribute gathers prior to the coherency filtering, low pass filtering and high pass filtering.

21. The method of claim 19 wherein the coherency filtering comprises F-X deconvolution.

22. The method of claim 19 further comprising coherency filtering a result of the subtracting.

23. The method of claim 22 wherein the coherency filtering the subtraction result comprises F-X deconvolution.

24. The method of claim 19 wherein the subtracting comprises adaptive subtracting.

25. The method of claim 19 wherein the frequency is about 40 Hz.

26. The method of claim 19 wherein a combined amplitude spectrum of a roll off portion of the low pass filtering and a roll off portion the high pass filter is substantially unity.

27. The method of claim 19 wherein the low pass filtering and the high pass filtering are substantially zero phase.

* * * * *

UNITED STATES PATENT AND TRADEMARK OFFICE
CERTIFICATE OF CORRECTION

| | |
|---|---|
| PATENT NO. | : 7,675,812 B2 |
| APPLICATION NO. | : 12/215862 |
| DATED | : March 9, 2010 |
| INVENTOR(S) | : Edward James Ferris |

It is certified that error appears in the above-identified patent and that said Letters Patent is hereby corrected as shown below:

Claim 14, column 8, line 36: replace "claim 10" with "claim 13".

Signed and Sealed this

Eighteenth Day of May, 2010

David J. Kappos
*Director of the United States Patent and Trademark Office*